(12) United States Patent
VanderLeest et al.

(10) Patent No.: US 7,328,098 B1
(45) Date of Patent: Feb. 5, 2008

(54) DETERMINING BLEED VALVE FAILURES IN GAS TURBINE ENGINES

(75) Inventors: Ruurd VanderLeest, Vernon, CT (US); David R. Walton, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/732,318

(22) Filed: Apr. 3, 2007

(51) Int. Cl.
*B60G 19/00* (2006.01)

(52) U.S. Cl. ......................................... 701/100; 60/785

(58) Field of Classification Search .................... 701/1, 701/36, 100; 60/785, 805
See application file for complete search history.

(56) References Cited

U.S. PATENT DOCUMENTS

| | | | | |
|---|---|---|---|---|
| 5,081,832 A | * | 1/1992 | Mowill | 60/792 |
| 6,047,540 A | * | 4/2000 | Dev | 60/805 |

* cited by examiner

*Primary Examiner*—Richard M. Camby
(74) *Attorney, Agent, or Firm*—Bachman & LaPointe

(57) ABSTRACT

The invention detects gas turbine bleed valve position discordances. The invention derives a modified exhaust gas temperature derivative as the predictive criteria in conjunction with a control logic to determine bleed valve position discordances that may indicate a mechanical failure in a valve, or in the control means for a valve.

11 Claims, 9 Drawing Sheets

DETERMINING BLEED VALVE FAILURES IN GAS TURBINE ENGINES

BACKGROUND OF THE INVENTION

The invention relates generally to gas turbine engines. More specifically, the invention relates to systems and methods that indicate bleed valve position.

Gas turbine engine bleed valves are used to obtain optimum efficiency while running and to avoid engine surge. The bleed valves improve efficiency by providing greater air flow through the engine. At lower power levels the additional bypass air obviates engine surge. The valves typically do not modulate, operating either in a full open or full closed position. When a bleed valve is closed, the engine forces more air through the compressor stage.

When a bleed valve fails to open from a closed position, or fails to close from an open position in response to a control system signal, engine performance suffers. If a bleed valve fails in an open position, a shortfall of power occurs since bleed air is ducted past the compressor stage making the engine less efficient. In most gas turbines, when this occurs, the engine is at its maximum allowed exhaust temperature.

To indicate bleed valve position, closed-end and open-end position switches or sensors may be employed to provide not-open and not-closed signals to an engine control system. The signals may be used for position indication and in a bleed valve discordance alarm. A discordance alarm is used to indicate when a valve, that has been instructed to transition, or stroke from either an open or closed position never reaches the destination position. The alarm indicates whether a mechanical failure has occurred in the valve or the valve operator. The valve may have failed at its initial position or during mid-stroke. Discordance alarms typically indicate either a not open or a not closed discord. However, position switches are impracticable for use on bleed valves due to the extreme operating temperatures encountered causing a high on-engine failure rate.

Due to the dynamics of bypass flow, bleed valve position affects several engine parameters that include burner (combustor) temperature, operating pressures, and high and low rotor speeds. However, these aspects are difficult to analyze and quantify for use as an indirect result of a bleed valve failure.

There is a need for a system and method to ascertain bleed valve discordances for a gas turbine engine that does not require position switches or sensors.

SUMMARY OF THE INVENTION

The inventors have discovered that it would be desirable to have systems and methods that derive an EGT velocity that predicts if a bleed valve did not transition from an initial position in response to an engine control system logic signal. The invention obviates nuisance alarms by incorporating a time delay and an interrupt from other transitioning bleed valves. The time delay accounts for a valve's stroke time and the external interrupt is for EGT perturbations that may manifest themselves during any bleed valve transition.

One aspect of the invention is a bleed valve position discordance system for a gas turbine. Systems according to this aspect of the invention comprise an input configured to accept exhaust gas temperature data from at least one exhaust gas temperature element, a processor configured to receive the exhaust gas temperature data and output a modified exhaust gas temperature velocity, a comparator having an input for receiving the modified exhaust gas temperature velocity and an output coupled to a time delay, the time delay having an output, and a logic and gate having a first input coupled to the time delay output and a second input coupled to a valve control signal, the and gate having an output wherein the and gate output indicates a valve discord depending on the comparator output and the valve control signal.

Another aspect of the system is where the processor further comprises a differentiator configured to receive the exhaust gas temperature data and output a current exhaust gas temperature velocity, a difference unit configured to receive the current exhaust gas temperature velocity and output a difference based on a current exhaust gas temperature velocity and a past exhaust gas temperature velocity, and a conditioner configured to receive the difference and output a modified exhaust gas temperature velocity.

Another aspect of the invention provides methods for determining gas turbine bleed valve position discordance. Methods according to this aspect of the invention preferably start with receiving temperature data from at least one exhaust gas temperature element, deriving a modified exhaust gas temperature velocity, comparing the modified exhaust gas temperature velocity with a predetermined setpoint, receiving a bleed valve position transition instruction, and annunciating a bleed valve discordance alarm for the bleed valve if the exhaust gas temperature derivative does not exceed the setpoint within a predetermined period of time.

Another aspect of the method is wherein deriving the modified exhaust gas temperature velocity further comprises calculating a current derivative from the exhaust gas temperature data, calculating a difference between the current exhaust gas temperature derivative and a past exhaust gas temperature derivative, denoising the difference, calculating a weight based on the denoised difference, applying the weight to the difference, applying a limit to the weighted denoised difference, and deriving a modified exhaust gas temperature velocity.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising,"

or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

The invention is not limited to any particular software language described or implied in the figures. A variety of alternative software languages may be used for implementation of the invention. Some components and items are illustrated and described as if they were hardware elements, as is common practice within the art. However, various components in the method and system may be implemented in software or hardware.

Embodiments of the invention provide systems and methods for detecting gas turbine bleed valve position discordances using EGT measurements. Bleed valve failures are normally determined when a gas turbine experiences a loss of performance. Performance is examined when an engine has been running at its full capacity and a loss of power output is noted. Power loss is usually observed after a period of time and is not conclusive with regard to a cause such as a bleed valve failure. Loss of power may be determined by monitoring the power output by a generator if the application is a combustion turbine.

The invention detects if a bleed valve position is in discord after the control system initiates a bleed valve open or close signal. A derivative of the EGT may be calculated in the engine control system which may be either a FADEC (full authority digital electronics control) or a PLC (programmable logic controller), and may require filtering since noise manifests itself from the differentiating process. The EGT measurement used in most gas turbines is acquired from a number of temperature sensors, typically equal to or greater than the number of burner cans.

The invention indirectly correlates bleed valve position with EGT by examining the velocity (slope) of a modified EGT derivative. Examination of the EGT velocities anticipate, or predict, bleed valve position. The invention may be performed as part of the overall gas turbine control system programming, or as a stand-alone digital processor (discrete time) or as an analog control system (continuous time).

Figures 1, 1A, 1B:
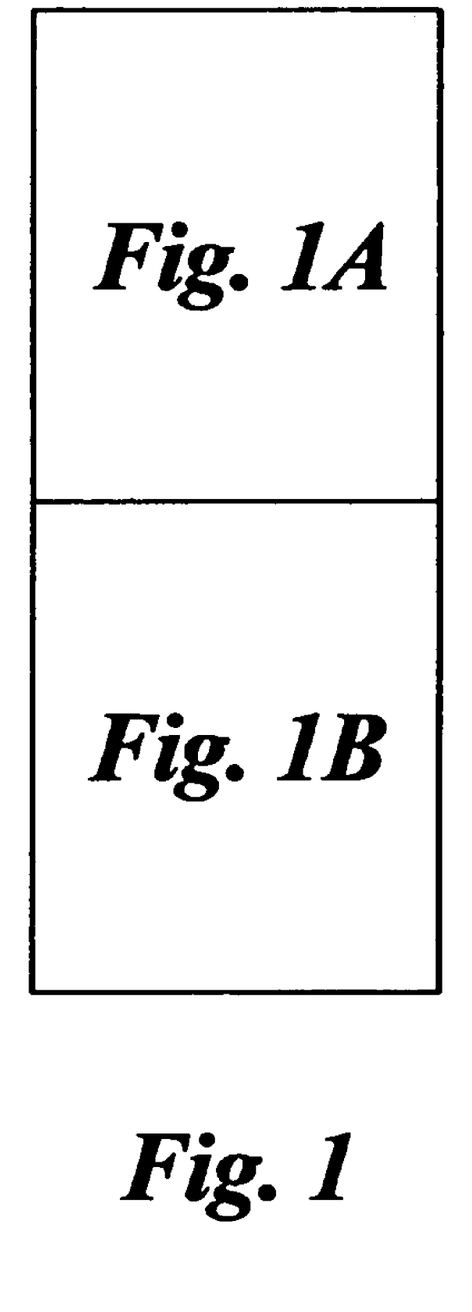
FIG. 1 is an exemplary method for deriving a modified EGT velocity.
Figure 1A:
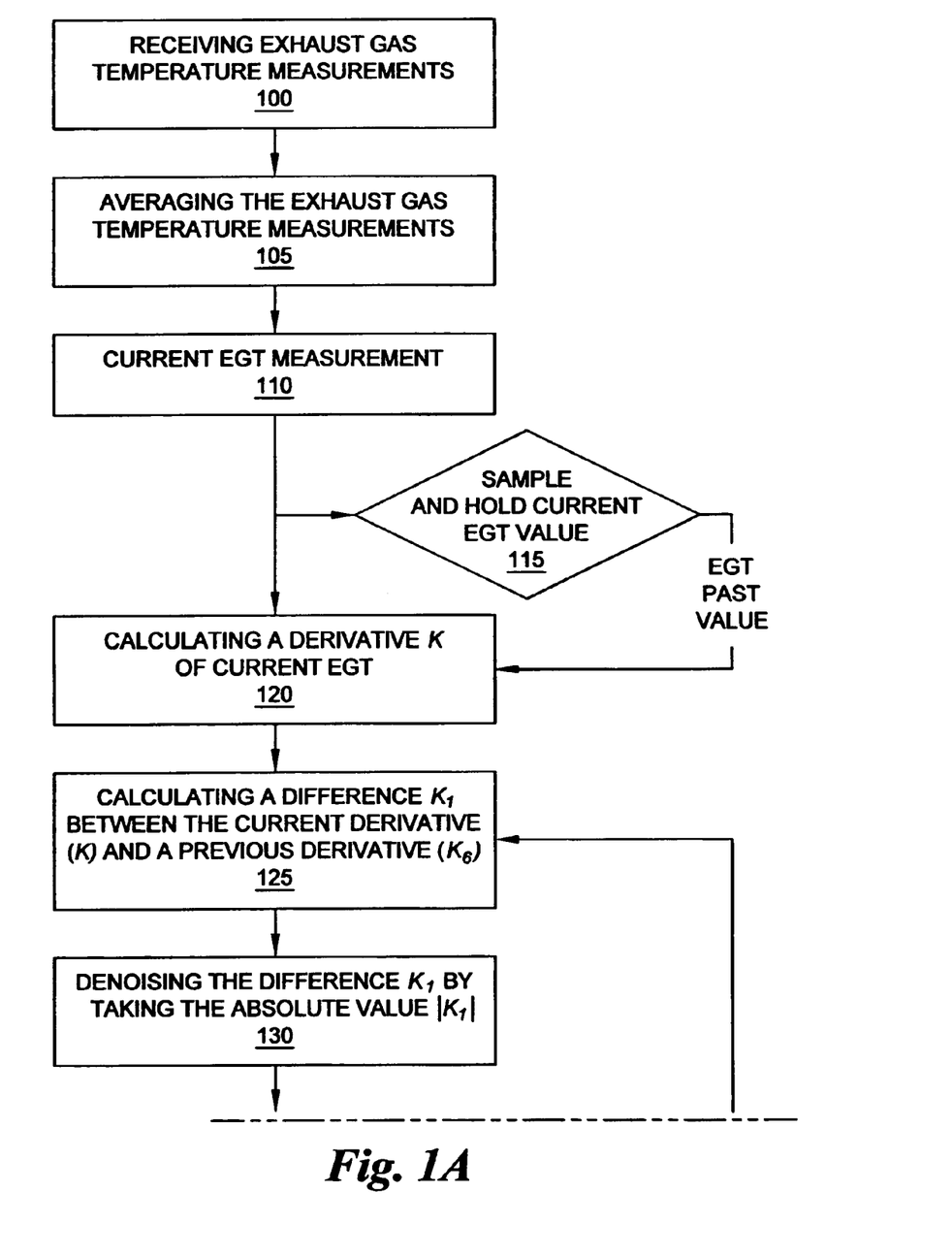
Figure 1B:
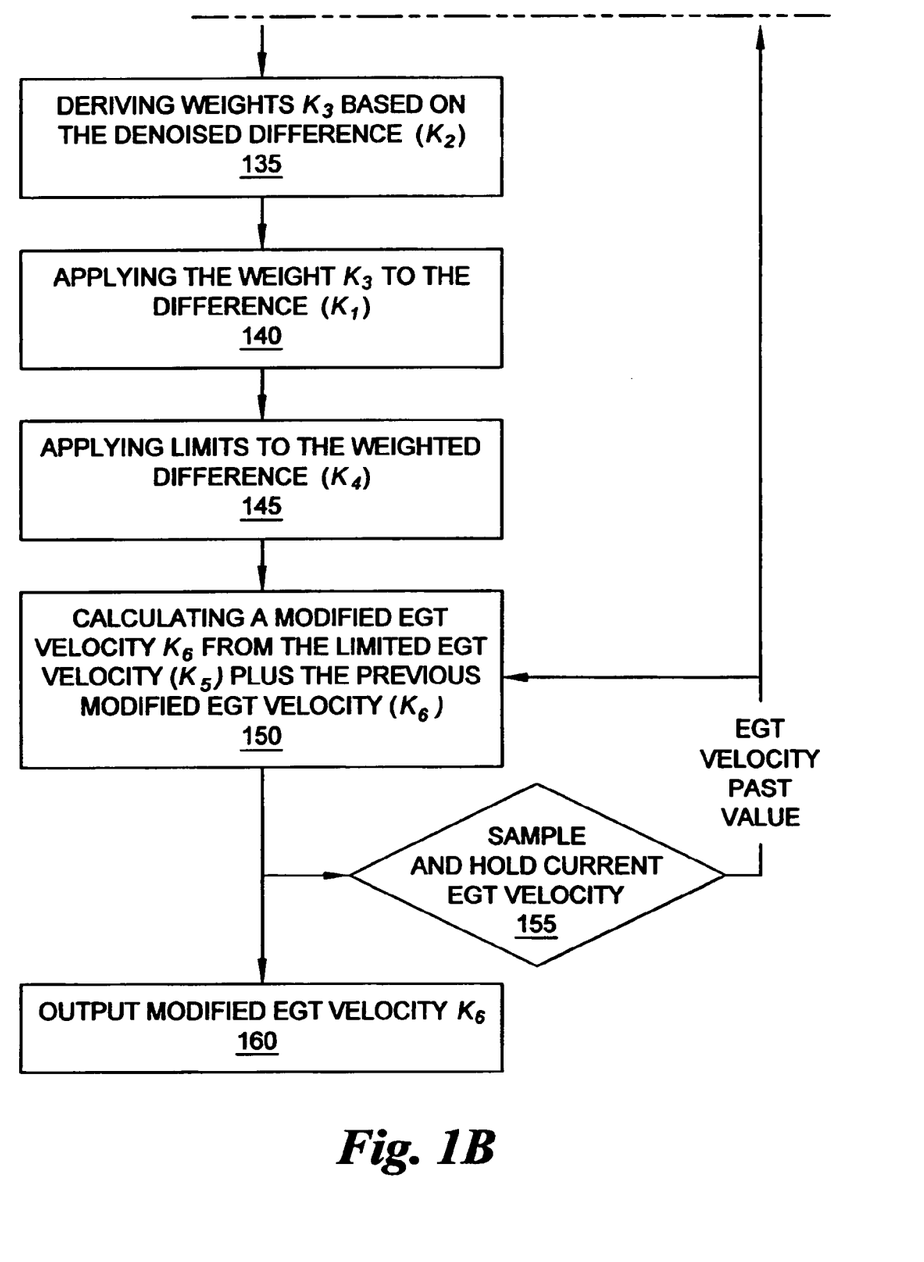

One approach to computing derivatives is finite differencing. This is performed by subtracting each incoming data point from the one following it, and dividing by the difference between them. For a function $f$ defined at data points $0=x_1, x_2, x_3 \ldots, x_N=L$, $$f'(x_i) \approx \frac{f(x_{i+1}) - f(x_i)}{x_{i+1} - x_i}, \quad (1)$$

where $f'(x_i)$ is the slope of the line joining two adjacent data points. The method of deriving a modified EGT velocity is shown in FIG. 1. The invention receives at least one EGT measurement, or if more than one EGT temperature sensor is employed, the system and method averages the temperature measurements into current EGT measurements at times n (steps 100, 105, 110).

For the invention, $$y(n) = \frac{x(n) - x(n-1)}{h}, \quad (2)$$

where y(n) is the first derivative (step 120) of EGT for a current EGT measurement x(n) (step 110) and a past EGT measurement x(n−1) (step 115), x is a value at time (n), and h is the difference between measurements Δt. x(n) may be the average of m temperature measurements every t seconds. For example, nine thermocouple measurements every 20 ms. (2) represents a model for the continuous time differential (1). Rewritten $$K = EGT_{derivativecurrent} = \frac{EGT_{current} - EGT_{past}}{samplerate}. \quad (3)$$

The method calculates a difference between a current EGT derivative and a past modified EGT derivative (step 125)

$$K_1 = K - EGT_{derivative\ past}(K_6). \quad (4)$$

An absolute value of $K_1$ is taken to denoise and make the value unipolar (step 130)

$$K_2 = |K_1|. \quad (5)$$

$K_2$ is compared with a constant, 500, that represents a rate of change of the EGT to derive a weighting value $K_3$ if $K_2 < 500$, then $K_3 = 0.05$ if $K_2 \geq 500$, then $K_3 = 1.0$ (6)

which may be either a unity or fraction gain (step 135). A weighted gain $K_4$ is calculated using the weighting value $K_3$ and derivative velocity $K_1$ (step 140)

$$K_4 = (K_3)(K_1). \quad (7)$$

$K_4$ is compared with a constant, 2, that represents an expected deviation and performs additional denoising for the rate of change calculation. The differentiation process may manifest noise giving an unsatisfactory result. To denoise, the differentiation process itself is regularized by constraining the derivative $K_4$ within a range of ±2. A maximum rate of change is derived $K_5$ if $K_4 > 2$, then $K_5 = 2$ if $K_4 < -2$, then $K_5 = -2$. (8)

if $-2 \leq K_5 \leq 2$, then $K_5 = K_4$

This relationship filters out large deviations in sampling and provides for a differentiation with low noise (step 145). The modified EGT derivative that is used to determine bleed valve position is (step 150)

$$K_6 = EGT_{derivative\ past}(K_6) + K_5. \quad (9)$$

As can be seen, the modified EGT derivative (velocity) is used as feedback in (4) (steps 155, 160).

Figure 2:
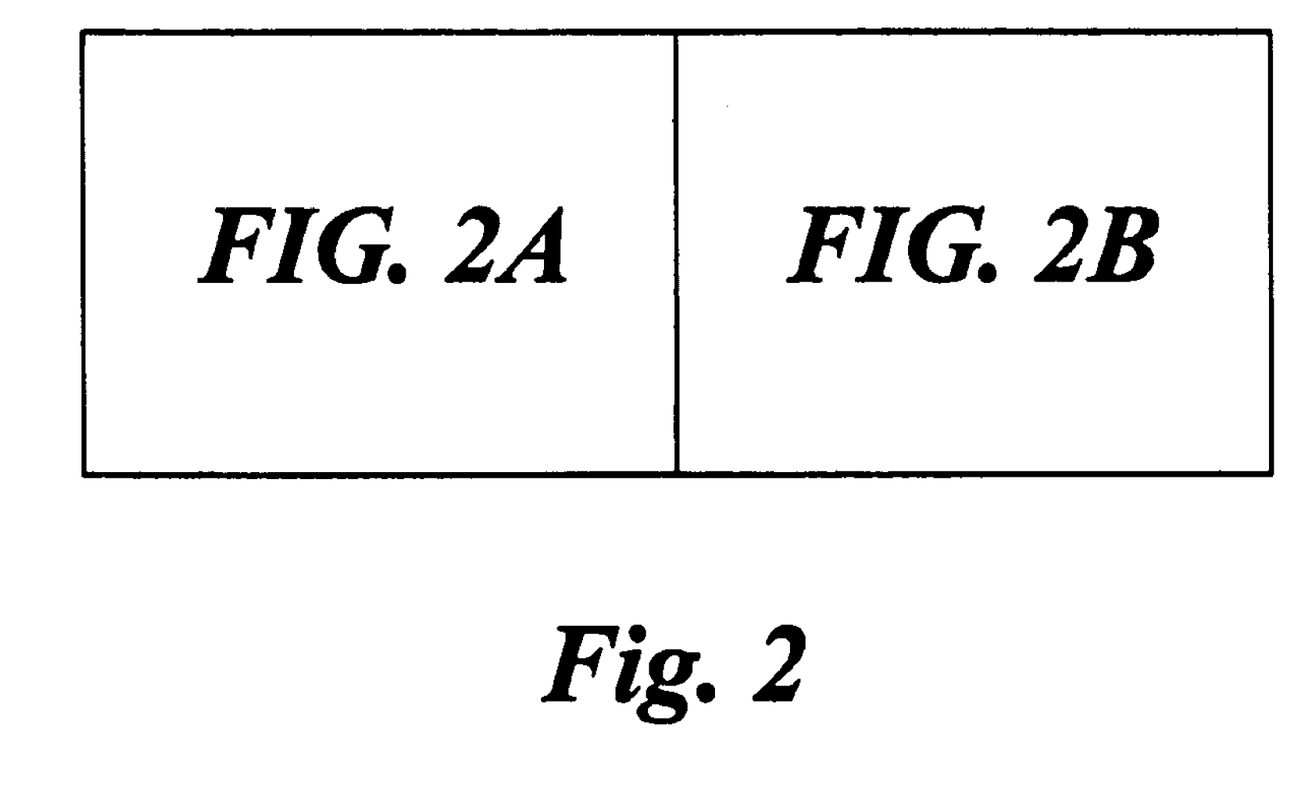
FIG. 2 is an exemplary system diagram of the invention.
Figure 2A:
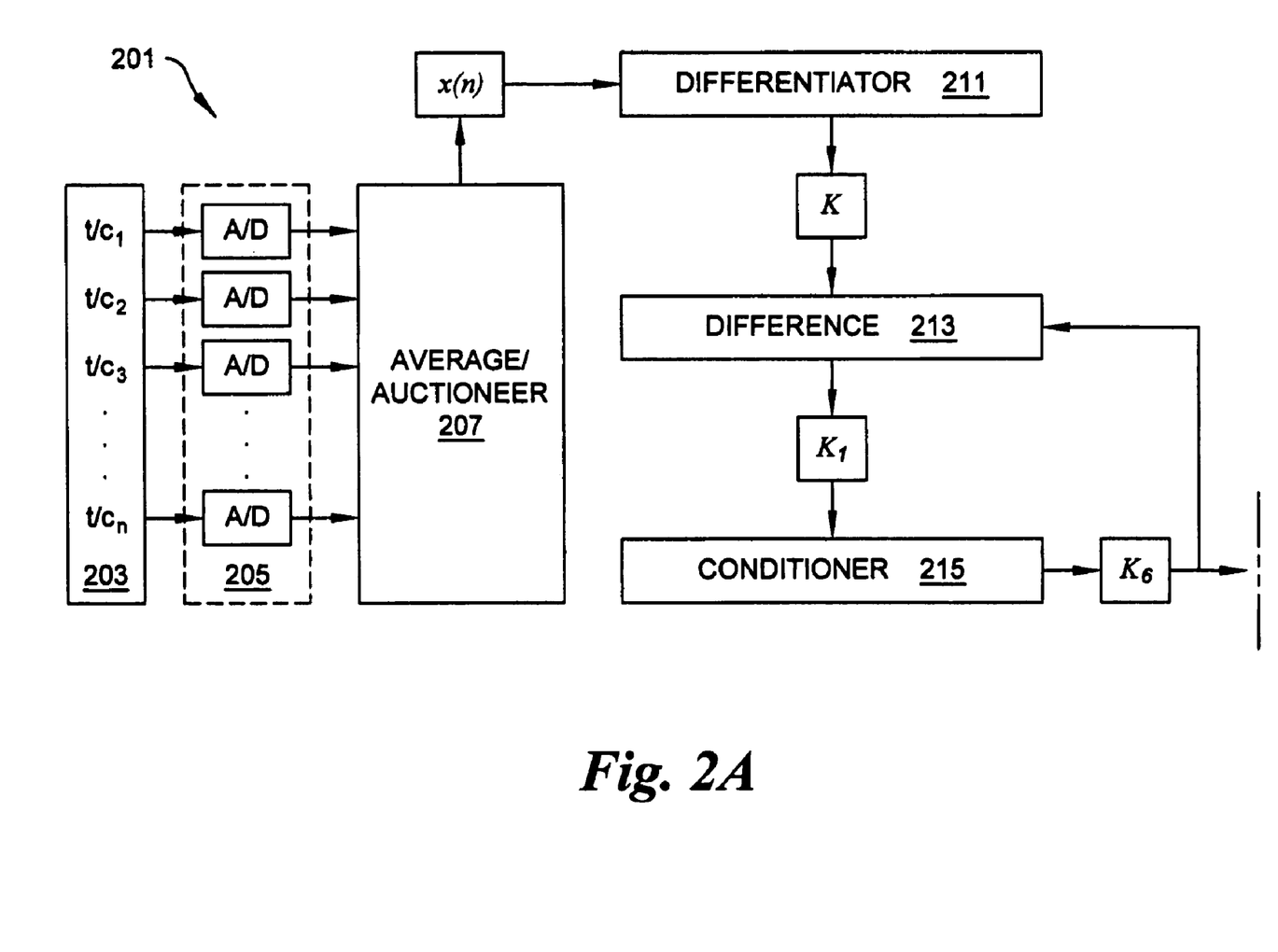
Figure 2B:
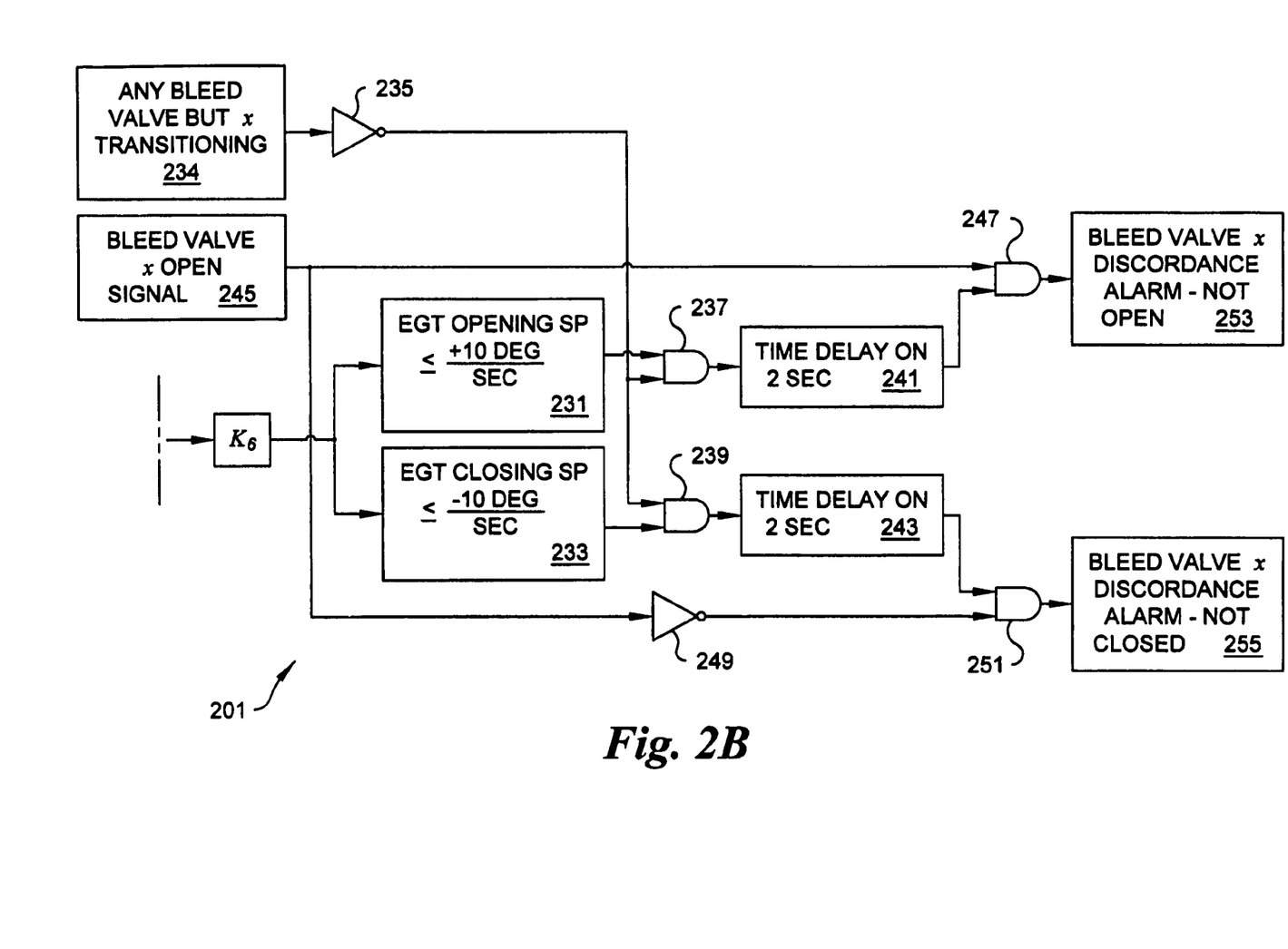

Shown in FIG. 2 is an embodiment of the system 201. The invention performs EGT differentiation in conjunction with a control logic to yield bleed valve position discordance alarms. The structure uses as input EGT measurement data.

At least one EGT temperature sensor 203, such as a resistance temperature detector (RTD), thermocouple (t/c), or the like is input to the system 201. The continuous time signals may be converted to discrete time using an analog to digital (A/D) converter 205 at a predetermined sampling rate $f_s$, and then averaged into one signal for output if a plurality of temperature sensors is used. An alternative embodiment may use an auctioneer, where the largest temperature measurement out of all temperature measurements for a given time t is output for processing 207.

Each EGT measurement x(n) is input to a differentiator 211. A derivative is output for two consecutive EGT values x(n), x(n−1). The output K of the differentiator 211 is input to a difference unit 213 to calculate a difference $K_1$ between the current EGT derivative K and a past modified EGT derivative $K_6$.

The output $K_1$ of the difference unit 213 is input to a conditioner 215 where denoising $K_2$, gain adjustment $K_3$, $K_4$ and range limiting $K_5$ are performed. The modified EGT derivative is output $K_6$ for use as a process input.

After the EGT derivative $K_6$ is obtained, logic is used to determine bleed valve position discordance. The EGT derivative is output to programmable comparators 231, 233. The invention compares the EGT velocity $K_6$ against predetermined, or variable setpoints. A setpoint is entered into each comparator 231, 233 corresponding to a positive or negative velocity (slope) that indicates bleed valve position discordance when a valve close or valve open logic signal is present. For example, the valve opening EGT velocity setpoint may be $$\leq \frac{+10\text{deg}}{\text{sec}},$$

the valve closing EGT velocity setpoint may be $$\leq \frac{-10\text{deg}}{\text{sec}}.$$

Other EGT velocity setpoints 231, 233 may be used.

The EGT velocity setpoints may be modified to accommodate different bleed valve sizes since different bleed sizes bypass different quantities of air. Additionally, the setpoints 231, 233 may be varied to take into account an engine that is accelerating or decelerating rapidly, where the EGT derivative would be sampled at the time of bleed closure and then compared to see if the value changes in a decreasing direction for bleed closing or increasing direction for bleed opening.

Figure 3A:
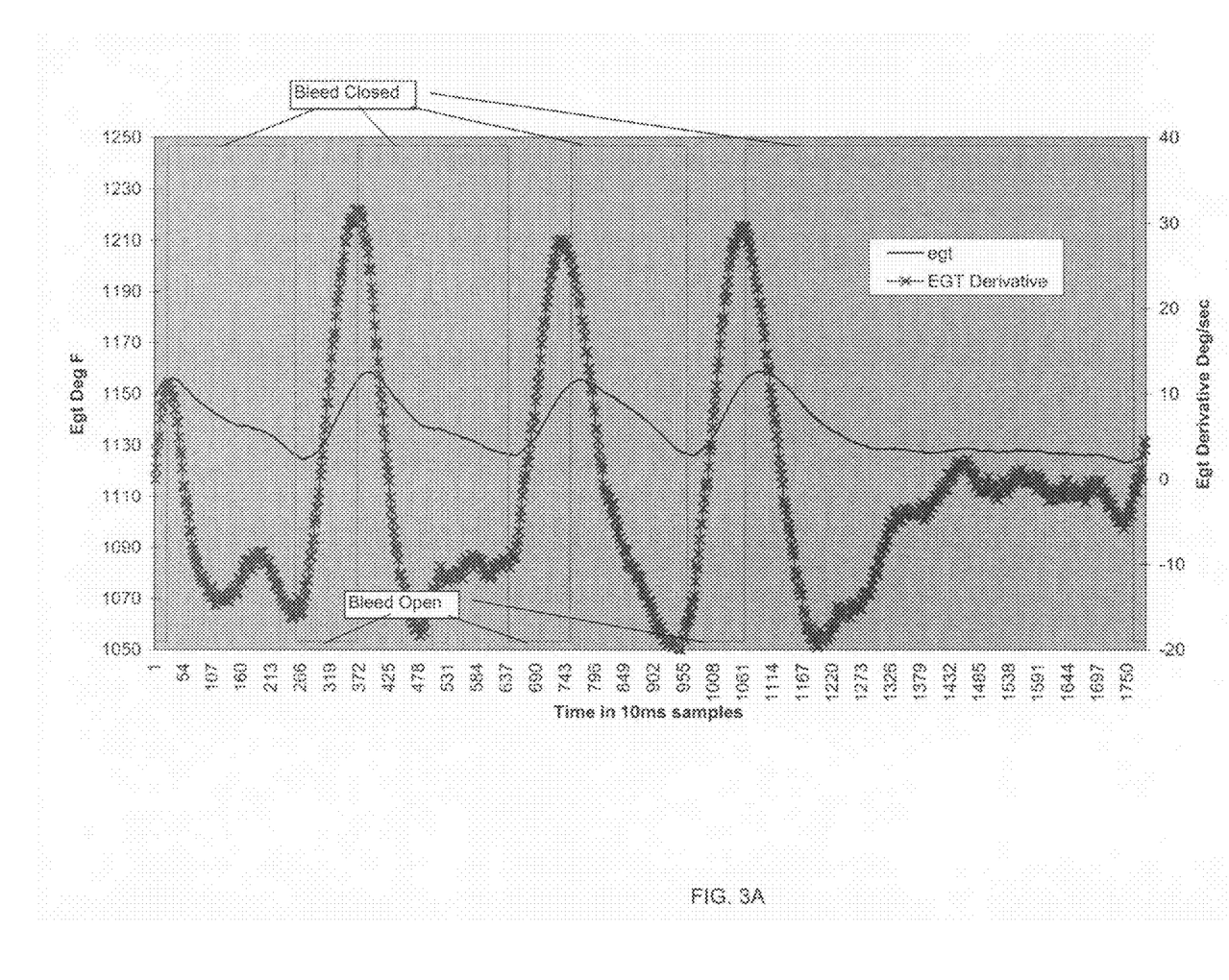
FIG. 3A is an exemplary plot showing bleed valve(s) closed and open positions, and corresponding exhaust gas temperature and EGT derivative during steady state.
Figure 3B:
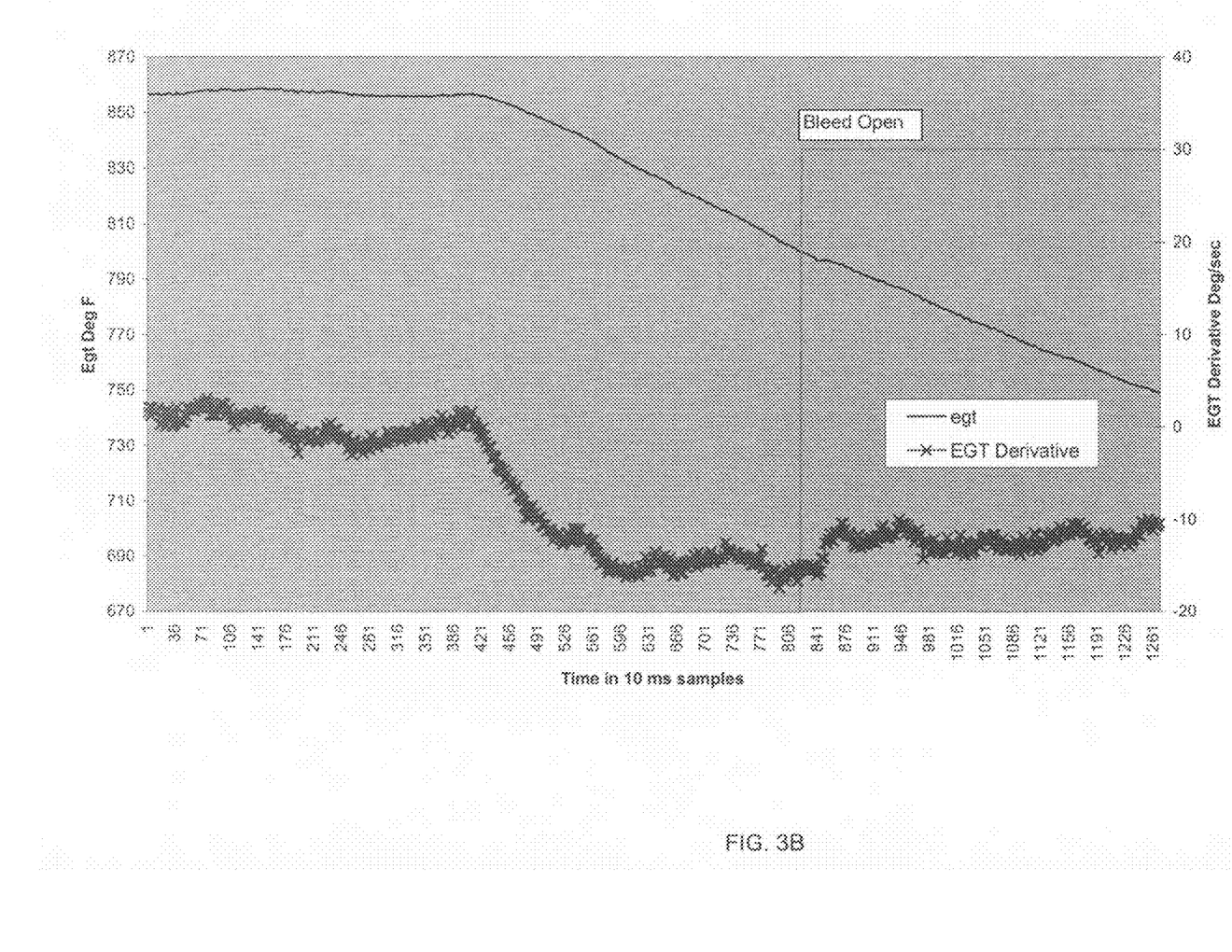
FIG. 3B is an exemplary plot showing bleed valve(s) transitioning from closed to open, and corresponding exhaust gas temperature and EGT derivative.

When an engine is operating at steady state, the EGT velocity deviation between closed and open is typically greater, making a distinction more predictable. However, if the engine experiences a transient, EGT velocity must be taken into account. Accordingly, the $$\frac{10\text{deg}}{\text{sec}}$$

may need to be altered. The derivative change for steady state and an engine experiencing a transient may be different as shown by the plots in FIGS. 3A and 3B.

FIG. 3A is a plot showing an EGT measurement, the modified EGT derivative according to the invention and bleed valve position. As can be seen, the modified EGT derivative tracks with bleed valve position. When the bleed valve(s) is opened, the EGT velocity experiences a positive slope. When the bleed valve(s) is closed, the EGT velocity experiences a negative slope. The rate of positive or negative change indicates whether a valve is in discord, or is operating properly. In this plot, the bleed valve is operating properly.

For example, if the EGT is moving at $$\frac{10\text{deg}}{\text{sec}},$$

actual bleed affects EGT velocity. In FIG. 3B, the engine is moving at approximately $$\frac{-15\text{deg}}{\text{sec}},$$

and the bleed valve(s) open and alter the EGT velocity such that bleed operation is detected by a change from $$\frac{-15\text{deg}}{\text{sec}}$$

to $$\frac{-12\text{deg}}{\text{sec}} \left( \Delta \text{ of } \frac{3\text{deg}}{\text{sec}} \right).$$

This would fit with a bleed change since opening a bleed bypasses exhaust air that would otherwise pass through the gas turbine. FIG. 3A shows an engine at steady state, where the change in the EGT velocity is greater $$\left( \frac{10\text{deg}}{\text{sec}} \right)$$

as there is no prevailing engine EGT movement since the engine reference is constant.

The comparator 231, 233 outputs are each coupled to an and gate 237, 239 input. A signal that indicates if any other bleed valve is transitioning 234 is coupled to another and gate 237, 239 input. The transitioning signal 234 is inverted via a not gate 235. This signal is to prevent nuisance alarms when other bleed valves are transitioning due to perturbations in EGT measurement samples.

Each and gate 237, 239 output is coupled to an input of a time delay on 241, 243. An output of each time delay will be a logic "one" if the input persists for the time delay period. The time delay 241, 243 accounts for bleed valve stroke time. The variable time delay 241, 243 is to prevent nuisance alarms from occurring if the signal $K_6$ indicates that the valve (valve x) is in discord while the valve is actually stroking from one position to the opposite position. In the preferred embodiment the time delay is set to 2 seconds.

If the engine control system calls for bleed valve x to open, a signal is output to the bleed valve logic to open in conjunction with a continuous signal 245 to the invention 201.

The invention analyzes the modified EGT velocity. If the opening EGT velocity is $$\leq \frac{+10\deg}{\sec},$$

the comparator 231 outputs a logic "one." If the EGT velocity is less than or equal to setpoint and persists longer than 2 seconds, a logic "one" is output from the opening time delay 241. The time delay 241 output is coupled to an and gate 247 input. An output of the and gate 247 is coupled to a bleed valve x position discordance alarm—not open 253.

If the engine control system calls for bleed valve x to close, the signal output to bleed valve x to close transitions in conjunction with the continuous signal 245 to the invention 201. The signal 245 is inverted 249.

The invention analyses the velocity of the EGT averaged derivative. If the velocity is $$\leq \frac{-10\deg}{\sec},$$

the comparator 233 outputs a logic "one." If the EGT velocity is less than or equal to setpoint and persists longer than 2 seconds, a logic "one" is output from the closing time delay 243. The time delay 243 output is coupled to an and gate 251 input. An output of the and gate 251 is coupled to a bleed valve x position discordance alarm—not closed 255.

Figure 4:
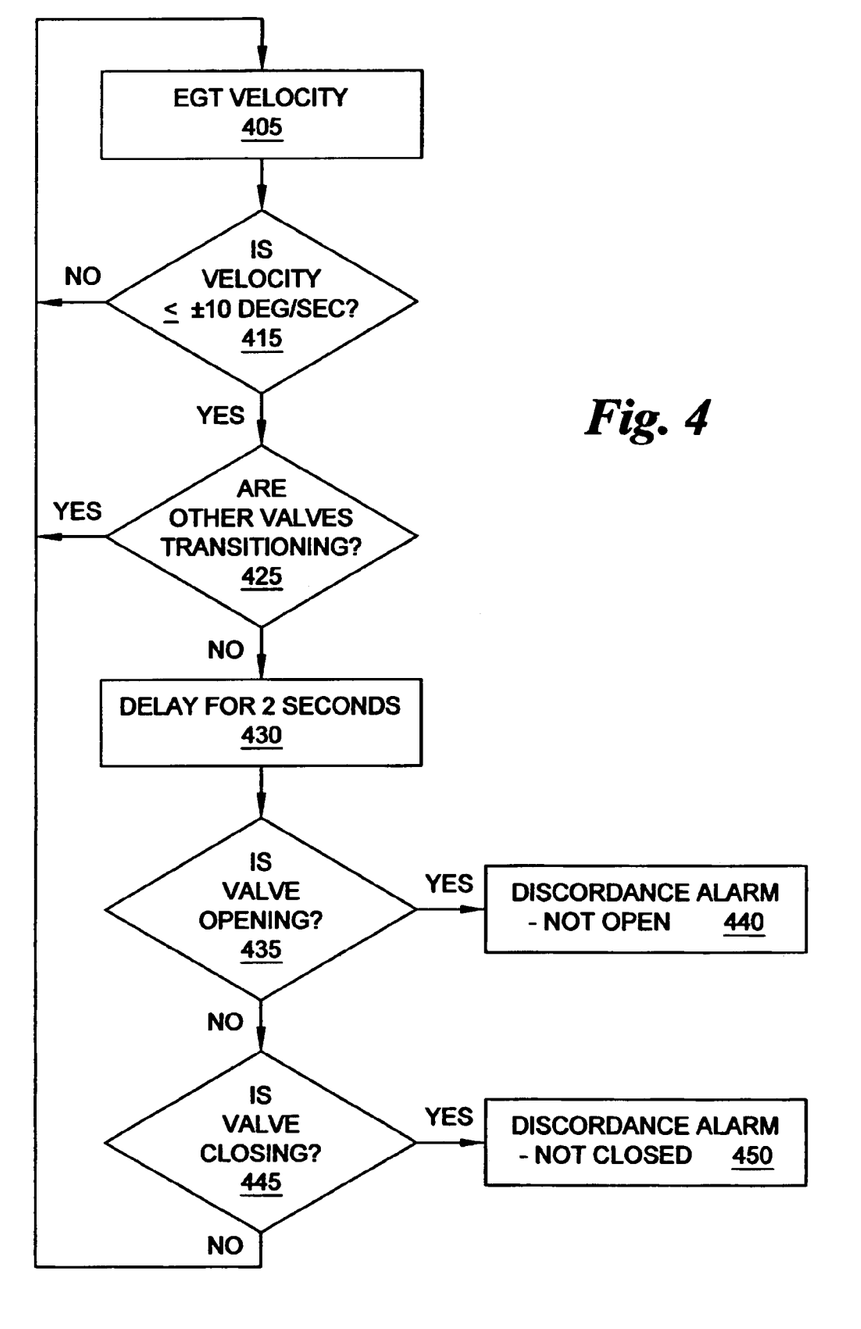
FIG. 4 is an exemplary method for deriving bleed valve discordance alarms.

A method for the discordance alarm is shown in FIG. 4. The modified EGT velocity (step 405) is compared against a setpoint (step 415). The preferred setpoint is $$\frac{\pm 10\deg}{\sec}.$$

The setpoint may be adjusted or varied based on another process parameter. If the process variable (velocity) is greater than the setpoint, no action occurs (step 415). If the process variable is less than or equal to the setpoint $$\left(\frac{-10\deg}{\sec} - \frac{0\deg}{\sec} - \frac{+10\deg}{\sec}\right),$$

a signal is output. If any other bleed valve used in the engine is transitioning, the signal is blocked (step 425).

If no bleed valves are transitioning (step 425), the modified EGT derivative must persist for a predetermined time delay period (step 430). If the velocity is less than or equal to setpoint and persists for the predetermined time delay period, and the bleed valve is instructed to open (step 435), a discordance alarm—not open is annunciated (step 440). If the bleed valve was instructed to close (step 445), a discordance alarm—not closed is annunciated (step 450).

One or more embodiments of the present invention have been described. Nevertheless, it will be understood that various modifications may be made without departing from the spirit and scope of the invention. Accordingly, other embodiments are within the scope of the following claims.

What is claimed is:

1. A bleed valve position discordance system for a gas turbine comprising:
    an input configured to accept exhaust gas temperature data from at least one exhaust gas temperature element;
    a processor configured to receive the exhaust gas temperature data and output a modified exhaust gas temperature velocity;
    a comparator having an input for receiving the modified exhaust gas temperature velocity and an output coupled to a time delay, the time delay having an output; and
    a logic and gate having a first input coupled to the time delay output and a second input coupled to a valve control signal, the and gate having an output wherein the and gate output indicates a valve discord depending on the comparator output and the valve control signal.

2. The system according to claim 1 wherein the processor further comprises:
    a differentiator configured to receive the exhaust gas temperature data and output a current exhaust gas temperature velocity;
    a difference unit configured to receive the current exhaust gas temperature velocity and output a difference based on a current exhaust gas temperature velocity and a past exhaust gas temperature velocity; and
    a conditioner configured to receive the difference and output a modified exhaust gas temperature velocity.

3. The system according to claim 2 wherein the comparator compares a predetermined valve velocity setpoint with the modified exhaust gas temperature velocity.

4. The system according to claim 3 wherein the modified exhaust gas temperature velocity may be a positive or negative direction.

5. The system according to claim 4 wherein the modified exhaust gas temperature velocity is positive when the valve is opening and negative when the valve is closing.

6. The system according to claim 5 wherein the time delay may be in a range from 0.5 seconds to 2.5 seconds.

7. The system according to claim 6 wherein the valve discord indicates that the valve is not opened if the valve control signal instructs the valve to open and the modified exhaust gas temperature velocity is less than or equal to the predetermined valve opening setpoint and persists longer than the time delay.

8. The system according to claim 7 wherein the valve discord indicates that the valve is not closed if the valve control signal instructs the valve to close and the modified exhaust gas temperature velocity is less than or equal to the predetermined valve closing setpoint and persists longer than the time delay.

9. A method for determining gas turbine bleed valve position discordance comprising:
    receiving temperature data from at least one exhaust gas temperature element;
    deriving a modified exhaust gas temperature velocity;
    comparing the modified exhaust gas temperature velocity with a predetermined setpoint;
    receiving a bleed valve position transition instruction; and
    annunciating a bleed valve discordance alarm for the bleed valve if the exhaust gas temperature derivative does not exceed the setpoint within a predetermined period of time.

10. The method according claim 9 wherein deriving the modified exhaust gas temperature velocity further comprises:
    calculating a current derivative from the exhaust gas temperature data;

calculating a difference between the current exhaust gas temperature derivative and a past exhaust gas temperature derivative;

denoising the difference;

calculating a weight based on the denoised difference;

applying the weight to the difference;

applying a limit to the weighted denoised difference; and deriving a modified exhaust gas temperature velocity.

11. The method according to claim 10 wherein the past exhaust gas temperature derivative is the modified exhaust gas temperature velocity.

* * * * *